United States Patent [19]

Green et al.

[11] Patent Number: 5,144,973
[45] Date of Patent: Sep. 8, 1992

[54] SAFETY VALVE FOR COMPRESSED GAS CYLINDERS

[75] Inventors: J. Kenneth Green, Ruidoso; Eugene L. Watson, Placitas; Paul S. Whalen, Oahu, all of N. Mex.

[73] Assignee: Safety Assurance Corporation, Albuquerque, N. Mex.

[21] Appl. No.: 800,046

[22] Filed: Nov. 29, 1991

[51] Int. Cl.$^5$ ............................................. F16K 17/40
[52] U.S. Cl. ..................................... 137/71; 137/68.1; 137/76; 137/513.3
[58] Field of Search ............... 137/68.1, 71, 76, 513.3, 137/855

[56] References Cited

U.S. PATENT DOCUMENTS

| | | | |
|---|---|---|---|
| 2,563,244 | 8/1951 | Holiger | 137/71 X |
| 2,945,503 | 7/1960 | Atkinson | 137/68.1 |
| 3,618,626 | 11/1971 | Russo | 137/68.1 |
| 3,630,214 | 12/1971 | Levering | 137/68.1 |
| 3,645,286 | 2/1972 | Follett | 137/68.1 |
| 3,648,893 | 3/1972 | Whiting | 222/3 |
| 3,794,057 | 2/1974 | Badger | 137/68.1 |
| 3,930,517 | 1/1976 | Gagala | 137/71 X |
| 4,064,889 | 12/1977 | Gayle | 137/68.1 |
| 4,077,422 | 3/1978 | Brinkley et al. | 137/68.1 |
| 4,562,852 | 1/1986 | Britt | 137/68.1 |
| 4,907,617 | 3/1990 | Whalen | 137/71 |

Primary Examiner—John Rivell
Attorney, Agent, or Firm—John R. Lansdowne

[57] ABSTRACT

A safety valve for fitting into a compressed gas cylinder to terminate gas flow from the cylinder when a primary gas valve attached to the cylinder port of the cylinder is deflected or severed. The safety valve is independently supported in the cylinder port below the location of the primary gas valve. A threaded housing having a channel for the passage of gas to and from the cylinder is threaded into the cylinder port below the location of the primary gas valve. A poppet seat is provided in the housing. A tubular portion of the threaded housing extends up and fits snugly into the gas passage of the primary gas valve. A cylindrical housing having apertures for the passage of gas is attached to the threaded housing. A poppet is provided in the cylindrical housing, which is biased into the poppet seat by a helical spring. The poppet is held off of the poppet seat by means of a frangible element. A relatively minor deflection, or shearing off, of the primary gas valve will be passed through to the frangible element, resulting in the breaking of the element and thereby allowing the poppet to seat in the poppet seat preventing the flow of gas from the cylinder to the primary gas valve. A polymer collar may be used in connection with the safety valve to eliminate thread leakage. A remote triggering device is set forth for seating the poppet in the poppet seat without a deflection or severing of the primary gas valve. Further, a flow restriction device for use with the safety valve is described.

41 Claims, 3 Drawing Sheets

SAFETY VALVE FOR COMPRESSED GAS CYLINDERS

BACKGROUND OF THE INVENTION

1. Field of the Invention

The present invention relates to a safety valve device for compressed gas cylinders and, more particularly, to a stand-alone safety valve configured to be seated in the port of a compressed gas cylinder, below and independent of the conventional primary gas valve, for the purpose of instantly shutting off gas flow in the event of mechanical deflection or severance of the primary gas valve, or on command.

2. Description of the Related Art

Compressed gas cylinders are potentially lethal missiles if the primary gas valve is severed or deflected so as to allow an uncontrolled release of the stored gas. Destruction from a runaway gas cylinder can be catastrophic in terms of human injury and property damage. An even more deadly potential exists if the cylinder contains toxic or explosive gases. Loss of life can result if these gases are accidentally released, whether or not the cylinder becomes an uncontrolled missile.

Primary gas valves have been designed so as to incorporate a safety shutoff device as part of a primary gas valve. In such devices, a secondary valve is incorporated into the primary valve, and it is biased into a held open position. At such time as the primary valve is severed, the secondary valve is actuated, preventing the sudden escape of gas from the high-pressure cylinder. Examples of prior art combination safety and service valves are shown and described in U.S. Pat. Nos. 3,648,893, 4,077,422, and 4,562,852. The secondary valves described in these patents include either a cylindrical plug which engages a flat seating surface, or a ball which engages a ball chamber, to close the flow passage.

The safety valve described in U.S. Pat. No. 4,907,617, authored by one of the inventors of the present invention, and having a common assignee, provided another means by which a safety valve could be integrated into a conventional primary valve. The safety valve portion of the primary valve includes a poppet seat and a poppet held off the poppet seat by a frangible element, which is held in compression by means of a helical spring. A severing of the primary valve, or other structural disruption of the valve, serves to break the frangible element, thereby seating the poppet in the poppet seat and shutting off the flow of gas from the cylinder. A unique advantageous feature of this safety valve is the use of a frangible element to hold off the seating of the poppet. This is not to say, however, that improvement of this earlier safety valve is not possible and indeed the present invention constitutes an improvement of the basic structure and characteristics of the safety valve described in the above-identified patent.

More particularly, while the earlier safety valve included a frangible element, the element will not break until the primary valve receives a significant blow resulting in the severing, or major structural distortion, of the primary valve. Therefore, it is desirable to provide a safety valve which shuts off gas flow upon relatively small deflections of the primary gas valve, or to shut off gas flow upon the command of the operator in the event the primary gas valve has become inoperative or ineffective due to leakage around the threads.

Further, the earlier safety valve must be mechanically integrated into the body of a primary gas valve. The retrofitting of a primary gas valve is difficult to perform and is met with disfavor by the manufacturers of primary valves. Therefore, it is desirable to provide a safety valve which could work cooperatively with conventional primary gas valves, but which does not have to be mechanically integrated into or require modification of the primary valve.

Even further, the earlier safety valve does not address the problem of gas leakage past the threads of the primary valve where the primary valve receives a blow resulting in damage to its threads. Blows to primary valves often result in leakage of gas about the threads, which can be extremely dangerous in the case of cylinders containing toxic or explosive gases. Therefore, it is desirable to provide a safety valve which forms an independent threaded seal with the cylinder, which will not be damaged in the event that the primary valve experiences thread damage.

SUMMARY OF THE INVENTION

It is an object of the present invention to provide a safety valve for a compressed gas cylinder which is an improvement over the earlier designs by virtue of incorporating structures capable of providing the advantageous functions noted above. In particular, in accordance with the present invention, a safety valve is provided which will shut off gas flow from a compressed gas cylinder upon relatively small deflections of the primary gas valve.

Another object of the present invention is to provide a stand-alone safety valve which works cooperatively with conventional primary gas valves and conventional compressed gas cylinders.

It is a further object of the present invention to provide a safety valve which does not require any modification to the primary gas valve.

Yet another object of the present invention is to provide a safety valve which will form an independent threaded seal with the cylinder, one which will not be damaged in the event that the primary valve experiences thread damage.

Further, in accordance with the present invention, a flow restriction device is provided to limit the flow of gas to a desired and pre-determined rate and yet not interfere with filling operations of the cylinder.

Yet another object of the present invention is to provide a safety valve which allows for the remote triggering of the safety valve on command of the user. In this manner, the safety valve can be triggered to stop the flow of gas from a cylinder where a primary gas valve has become inoperable due to corrosion or mechanical failure or where the primary valve is leaking about its threads.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

3

DETAILED DESCRIPTION OF PRESENTLY PREFERRED EMBODIMENTS

Figures 1, 2, 6, 13:
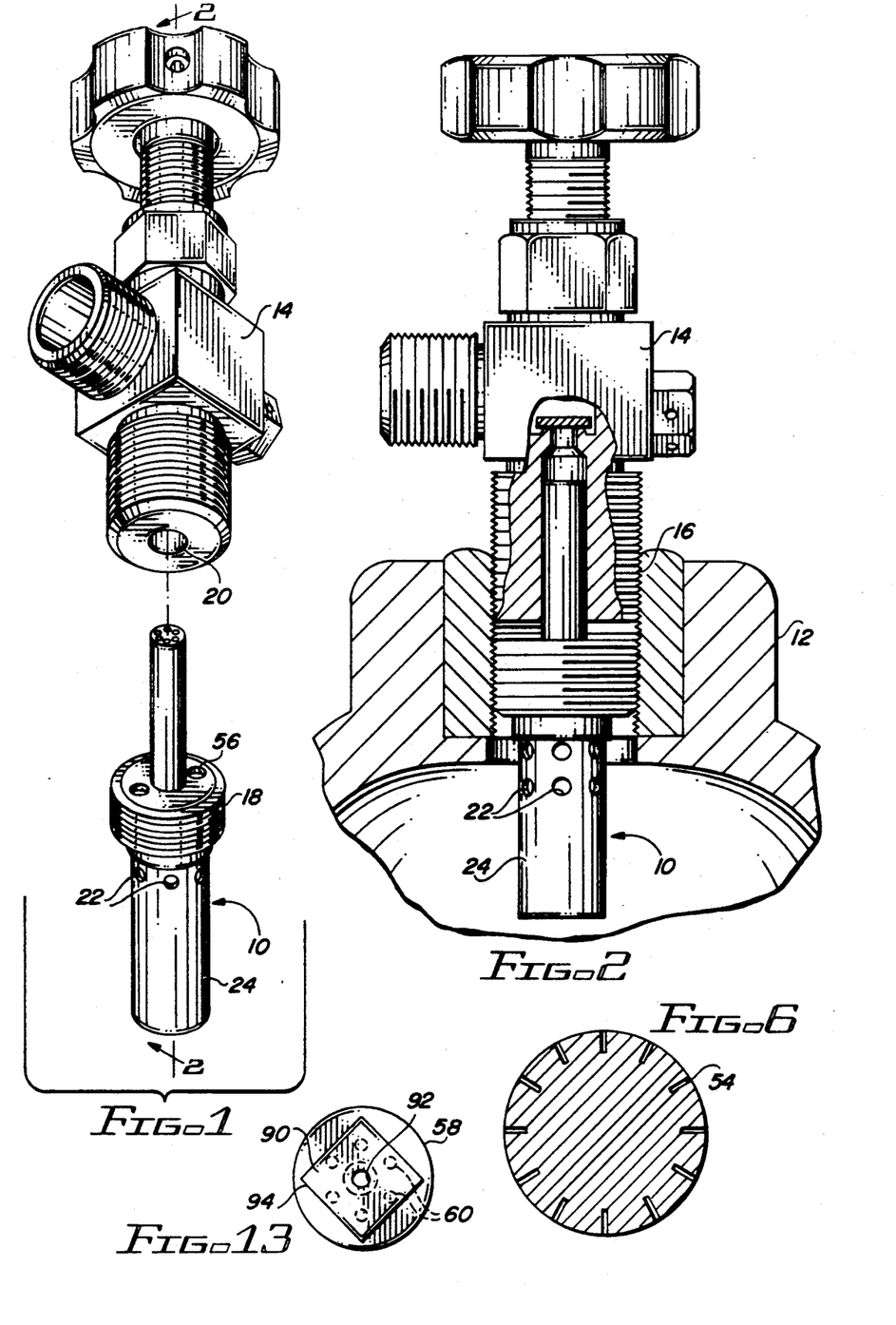
FIG. 1 is an elevational perspective view of a safety valve provided in accordance with the present invention, and showing how the safety valve is used with a primary valve.
FIG. 2 is a broken-away front elevational view showing the valve provided in accordance with the present invention inserted into a compressed gas cylinder and located below and operating independently of but in cooperation with a primary valve.
FIG. 6 is a cross sectional view of the ceramic pin of FIG. 5 showing the holes ablated by the laser beam.
FIG. 13 is a bottom plan view of the valve provided in accordance with the present invention showing the addition of a flow restriction device.

An improved safety valve provided in accordance with the present invention can be seen for example in FIGS. 1 and 2. The valve 10 is adapted for use with a conventional compressed gas cylinder 12 of a type used to store fluids at high pressures and with a conventional primary valve 14. The primary valve is used to regulate the flow of a gas from the cylinder and to provide a flow passage through which the cylinder may be filled, or emptied. The safety valve 10 is a self-contained unit which works independently of but cooperatively with the primary valve 14. It threads into the cylinder port 16 in advance of the primary valve 14 and is positioned below that threaded portion of the cylinder port occupied by the primary valve. As can be best seen in FIG. 1, the threaded housing 18 of the safety valve is snugly received into the gas passage channel 20 of the primary valve. During normal operation, gas from the compressed gas cylinder flows through the inlet ports 22 of the cylindrical housing 24 of the safety valve, through the threaded housing 18, and into the gas channel 20 of the primary valve. The primary valve operates normally, and the safety valve is invisible to the primary valve's function. Two-way gas flow through the primary valve is minimally affected by the presence of the safety valve. However, the presence of the safety valve protects against release of gas in the event of severance or significant deflection of the primary valve. If the primary valve is deflected as much as 10 degrees from vertical or if it is severed, the safety valve activates to instantly shut off gas flow from the compressed gas cylinder.

Figures 3, 4, 5, 14:
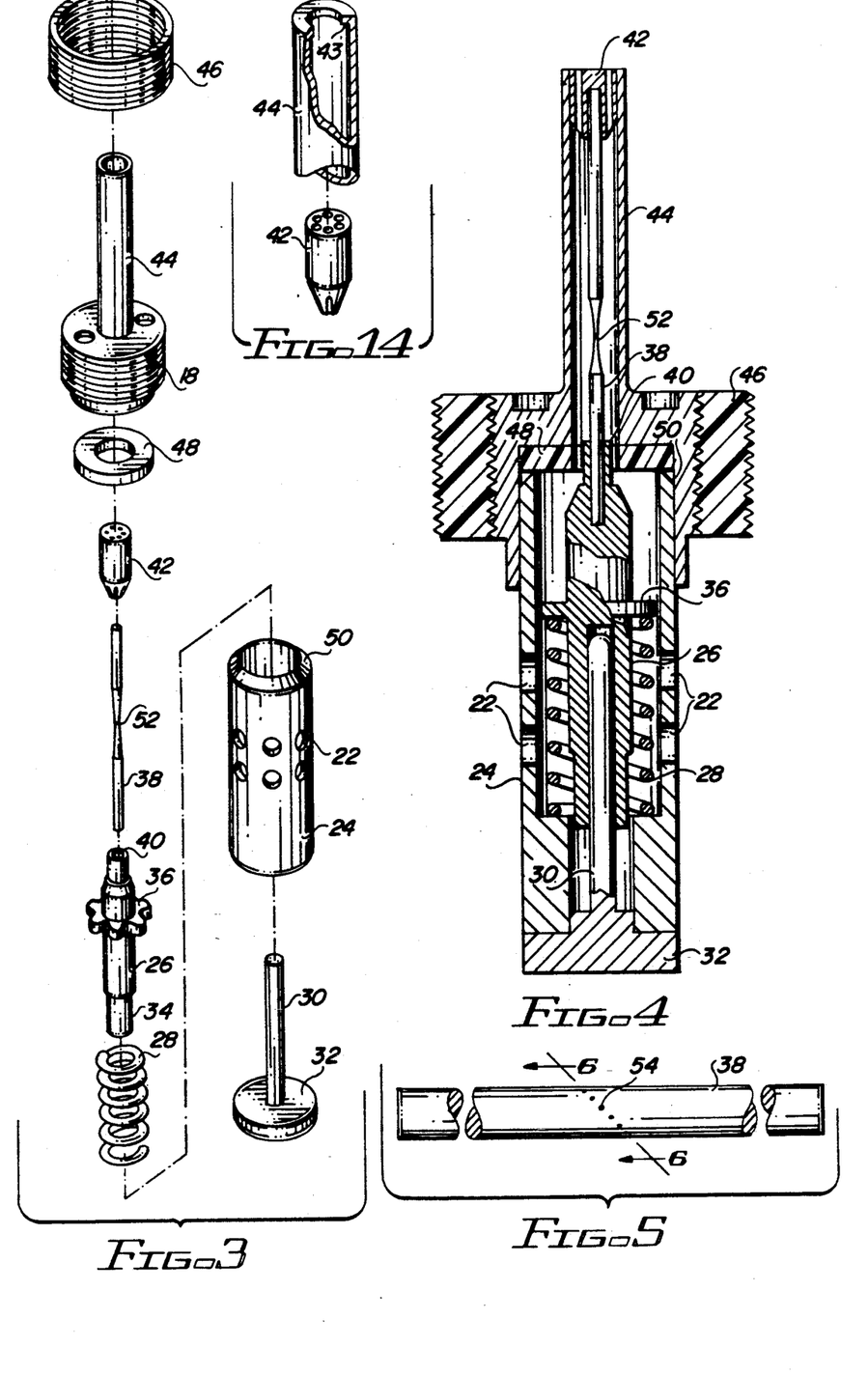
FIG. 3 is an exploded view of a first preferred embodiment of the valve provided in accordance with the present invention.
FIG. 4 is a cross-sectional view of the valve of FIG. 3.
FIG. 5 is a plan view of a frangible ceramic pin provided in accordance with the present invention displaying holes ablated by a laser beam.
FIG. 14 is a broken-away elevational view of the threaded housing of FIG. 3 showing an alternative means for engaging the cone in said housing.

Referring now to FIG. 3, the safety valve includes a cylindrical housing 24 and a threaded housing 18, which are attached together as more fully described below. Apertures 22 are cut into the cylindrical housing to allow for the passage of gas from the compressed gas cylinder through the cylindrical housing, through the threaded housing, and into the gas passage of the primary valve. The threaded housing 18 seats the safety valve into the cylinder port 16. The threaded housing provides for a poppet seat (not illustrated). A poppet 26 is biased into the poppet seat by the helical spring 28. The poppet slidably travels on shaft 30 which is centered within and held in place in the lower portion of cylindrical housing 24 by means of flange 32. The flange is welded or otherwise permanently attached to the lower end of cylindrical housing 24. The helical spring 28 is positioned on shaft 34 to bias the poppet into the poppet seat preventing the flow of gas to and from the cylinder. The poppet 26 slidably travels within the cylindrical housing 24 by means of guide 36, which is configured to allow the passage of gas around the poppet. The tubular portion 44 of the threaded housing 18 contains a frangible element 38 disposed longitudinally within the tube. One end of the frangible element is snugly received in a channel 40 in poppet 26. The other end of the frangible element is received into the cone 42. The cone incorporates a number of gas passages to allow for the flow of gas through the threaded housing and into the gas passage channel of the primary valve. The cone is welded or permanently attached within the tubular portion of the threaded housing. The cylindrical housing 24 is forced inside the threaded housing 18, and the cylindrical housing is then welded or permanently attached to the threaded housing completing the assembly of the valve. This force places the frangible element into compression, compresses the helical spring 28, and disposes the poppet away from the poppet seat allowing for the free passage of gas through the safety valve.

The tubular portion 44 of the threaded housing 18 is sized so as to be received snugly inside the gas passage 20 of the primary gas valve. The inside diameter of the gas passage of the primary gas valve is consistent among the various manufacturers of primary valves. However, minor variations in diameter can be accommodated through the use of sleeves of differing thickness to slip over the tubular portion of the threaded housing and be snugly received into the gas passage of the primary valve. A tightly fitting helical spring can also be slipped over the tubular portion of the threaded housing to assist in achieving a tight fit. It is desirable to achieve a snug mating of the threaded housing of the safety valve and gas passage of the primary gas valve.

A collar 46 with inside and outside threads may be employed between the threads of the safety valve and those of the cylinder port. Use of a collar aids in the seating of the safety valve in the lower threads of the cylinder port 16 and greatly reduces the risk of thread leakage at the cylinder port in the event of damage to the primary valve. The collar is made from a compliant material compatible with the gas service. For most gases, such a material would ideally be a polymer material. A particularly suitable material for the collar is Kel-F, which is a registered trademark of 3M Corporation for a proprietary fluoroplastic. Kel-F is particularly desirable as it is harder than most polymers, easily machined, and does not cold-flow as readily as other similar polymers.

The use of collars of varying sizes can facilitate the use of a standard safety valve in cylinder ports of slightly different tolerances, or the placement of the valve at varying levels in the cylinder port. It has been found that a standard size collar, and additional collars sized to be one and one-half turns larger and smaller than the standard, will allow for the correct fitting of the safety valve into virtually all cylinder ports. Consistent with standards established by the Compressed Gas Association, cylinder ports have tapered threads cut by taps. Of necessity, the lower threads in the cylinder port are less precise than are the upper threads. Use of a collar made from a polymer material facilitates the insertion of the safety valve into the lower region of the cylinder port and ensures a tight seal.

Thread leakage can be a significant problem for various kinds of gas service. Often when a primary valve receives a blow or is more slowly deflected from the vertical, thread damage occurs, resulting in a slow leak through the threads of the primary valve and the cylinder port. Thread leakage from compressed gas cylinders containing toxic or explosive gases can be catastrophic in terms of human death, injury, and property damage. Complicating the situation, thread leakage often is difficult to determine until harm occurs. Use of the collar 46 with the safety valve establishes an extremely tight seal below the threads of the primary valve. Subsequent damage to the threads of the primary valve will not result in a leak around the threads of the safety valve, as the blow or deflection received by the primary valve is not transmitted to the safety valve threads.

Referring now to FIG. 3, a washer 48 is employed in safety valves where it is important to eliminate any possible gas leakage, such as in the case of gas service involving toxic or explosive gases. The washer 48 is compressed between the cylindrical housing 24 and the threaded housing 18. A knife edge 50 is cut into the top rim of the cylindrical housing 24 and a second knife edge (not shown) is cut into the portion of the threaded housing 18 receiving the washer (not shown). Compression of the washer between the mating knife edges minimizes leakage between the cylindrical housing and the threaded housing. The center hole cut in the washer serves as the poppet seat to receive the poppet. The washer is made from a compliant material suitable for the gas service. For most gases, such a material would ideally be a polymer material. As discussed above for the collar 46, a particularly suitable material for the washer is Kel-F.

The safety valve of the present invention may be made of various materials consistent with the gas service. A particularly appropriate material for the valve is a stainless steel, such as 316 or 316L stainless steel, which is corrosion-resistant and can be cleaned and electropolished. Alternative materials for the valve include: brass; bronze; nickel alloys, such as INCONEL; plastics, such as fiber resin plastic; and various polymers used in valving. In cases where stainless steel cannot be used, such as with fluorine gas, an aluminum-silicon-bronze alloy may be utilized.

The frangible element 38 of the present invention may also be made from various materials and in various configurations. The material selected should have a high ratio of compression and tensile strength to shear strength and be compatible with the gas service. In one preferred embodiment of the invention, the frangible element is a ceramic pin formed of alumina (aluminum oxide), which is corrosion-resistant to many types of gases. An alumina ceramic pin has high compression and tensile strength and low shear strength. When relatively low bending and shear stresses are applied to the pin, the pin will fracture.

It is desirable to be able to anticipate where the frangible element will break by mechanically weakening the pin. In one embodiment of the invention, the frangible pin 38 has a waist 52 cut round the pin to establish a zone of decreased shear strength, inducing the pin to break in this zone. In the alternative, if a ceramic frangible element is used, a waist or other zone of decreased shear strength can be molded into the ceramic material at the time the pin is formed, and before the material is fired.

In another preferred embodiment, the frangible element may be weakened by the use of a laser beam. As shown in FIGS. 5 and 6, an industrial laser may be used to ablate a number of holes 54 into the circumference of a frangible ceramic pin. In a preferred embodiment, an industrial laser is used to ablate 10 to 20 spaced indentations into the ceramic pin with a depth to width aspect ratio in the range of 5:1 to 1:1. The holes may be made by turning the pin while the laser is held in a fixed position. The pin can also be translated along the longitudinal axis of the pin while the pin is turned before the laser. One cycle of translation to one cycle of rotation will result in an elliptical pattern of holes in the pin as shown in FIG. 5.

In use, then, a safety valve of the present invention is selected which is constructed of materials compatible with the gas service. The tubular portion 44 of the threaded housing 18 is checked to assure a snug fit into the gas passage channel 20 of the primary valve being utilized. If necessary, cylindrical shims or a helical spring may be utilized between the tubular portion of the threaded housing and the gas passage channel of the primary valve to ensure a snug fit. The position of the primary valve in the cylinder port is identified, and the safety valve is screwed into the cylinder port to a level immediately below the level to be occupied by the primary valve. If the gas service involves toxic or explosive gases, a collar 46 is utilized to prevent thread leakage. Spanner holes 56 and a suitable spanner wrench (not illustrated) are utilized to seat the safety valve at the appropriate level of the cylinder port. The primary valve is then screwed into the cylinder port in its customary position.

The safety valve remains in the cylinder port throughout the service life of the primary gas valve. The primary valve is operated normally and the safety valve is invisible to the primary valve's function. In the event that the primary valve receives a blow which severs the primary valve, or a force which deflects the primary valve as much as 10 degrees from the normal, the shear stress on the primary valve is transferred to the tubular portion 44 of the threaded housing 18. This stress is thereby further transferred to the frangible element 38. As the frangible element is unable to withstand bending and shear stresses, it will break at its weakest point. Upon the breaking of the frangible element, the helical spring 28 will cause the poppet 26 to seat in the poppet seat, instantly shutting off the gas flow from the compressed gas cylinder.

Once the safety valve has been actuated, the compressed gas cylinder will remain in a safe condition until the cylinder can be emptied of its contents. A cylinder containing a non-toxic or non-explosive gas can be emptied by, first, securing the cylinder; second, removing the remaining portion of the primary valve; and, third, performing a controlled bleeding off of the gas in the cylinder. The controlled bleeding can be effected by applying controlled pressure to the poppet 26 so as to force the poppet off of the poppet seat. A tool or jig (not illustrated) may be utilized to apply controlled pressure on the poppet. The same steps are used to empty a cylinder containing a toxic or explosive gas. However, it is also necessary to employ means to collect the gas leaving the cylinder and prevent leakage to the atmosphere. A cylinder coffin and/or a gas collection chamber may be utilized for this purpose.

Figures 7, 8, 9, 10, 11, 12:
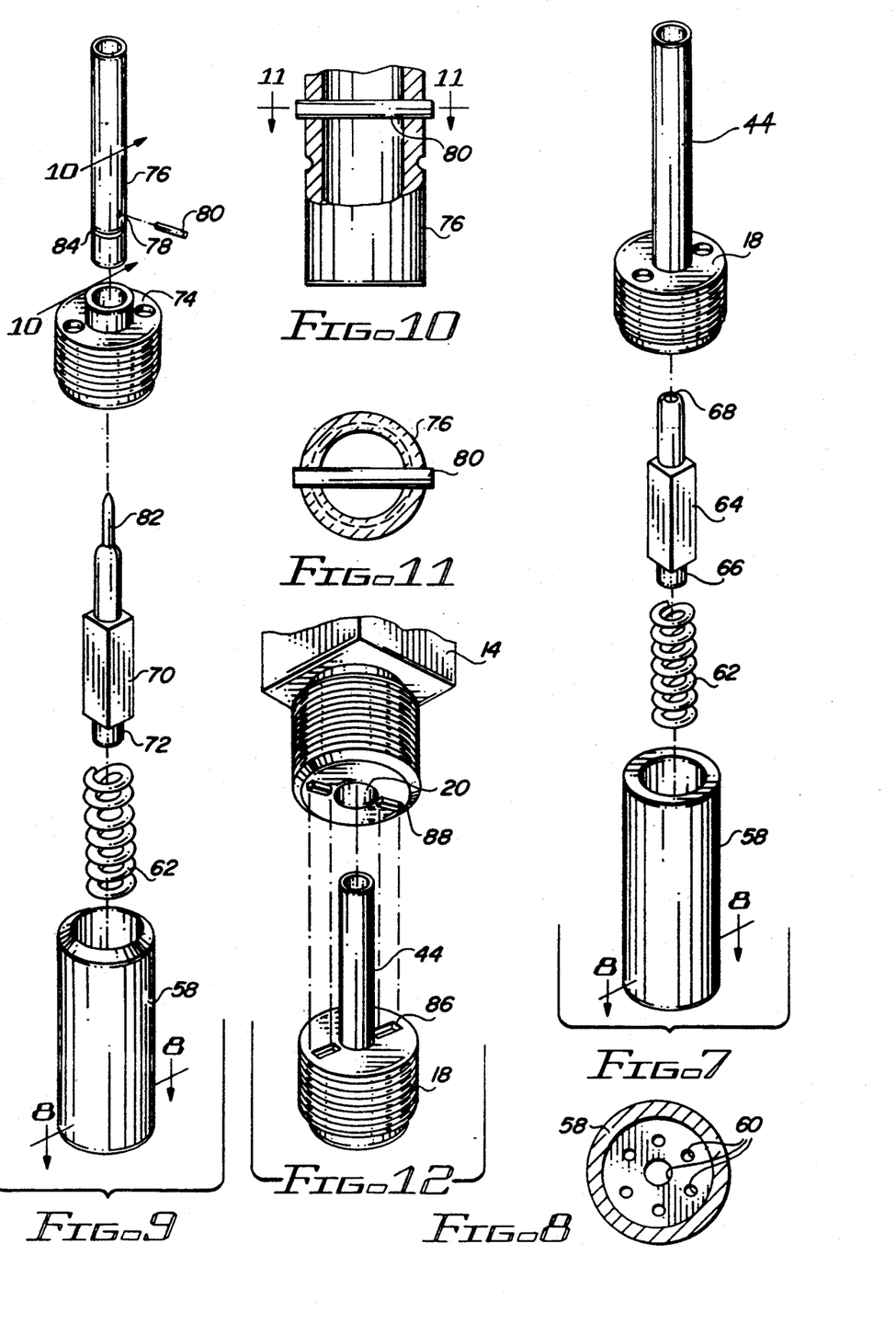
FIG. 7 is an exploded view of a second preferred embodiment of the valve provided in accordance with the present invention.
FIG. 8 is a cross-sectional view of the cylindrical housing of FIG. 7.
FIG. 9 is an exploded view of a third preferred embodiment of the valve provided in accordance with the present invention.
FIG. 10 is a broken-away elevational view of the tubular portion of the threaded housing of FIG. 9 showing the location of the spring pin.
FIG. 11 is a cross-sectional view of FIG. 10 showing a second view of the location of the spring pin.
FIG. 12 is a perspective broken-away elevational view of the valve provided in accordance with the present invention showing slots on the safety valve which engage prongs on the primary valve.

Referring now to FIG. 7, a second preferred embodiment of an improved safety valve provided in accordance with the present invention can be seen. The safety valve has fewer parts, is less expensive to manufacture, and is particularly suitable for use with non-toxic gas service. A cylindrical housing 58 and a threaded housing 18 are attached together as more fully described below. Referring to FIG. 8, apertures 60 are cut into the bottom end of the cylindrical housing to allow for the passage of gas from the compressed gas cylinder through the cylindrical housing, through the threaded housing, and into the gas passage channel 20 of the primary valve. The threaded housing 18 seats the valve into the cylinder port 16. The housing provides for a poppet seat (not illustrated). A poppet 64 is biased into the poppet seat by the helical spring 62. The poppet 64 is machined from square stock of a size which can snugly, but slidably, travel inside the cylindrical housing 58. The helical spring 62 is positioned on shaft 66 to bias the poppet into the poppet seat preventing the flow of gas to and from the compressed gas cylinder. The poppet 64 slidably travels within the cylindrical housing 58 guided by the edges of the stock from which it is machined. Gas is allowed to pass along the sides of the poppet. As was described in the first preferred embodiment, the tubular portion 44 of the threaded housing 18 contains a frangible element 38 disposed longitudinally within the tube. One end of the frangible element is snugly received in a channel 68 in poppet 64. The other end of the frangible element is received in a cone 42. The frangible element 38 and cone 42 are illustrated by reference to FIG. 3. The cone incorporates a number of gas passages to allow for the flow of gas through the threaded housing and into the gas passage channel of the primary valve. The cone is welded or permanently attached within the tubular portion of the threaded housing. The cylindrical housing 58 is forced inside the threaded housing 18, and the cylindrical housing is then welded or permanently attached to the threaded housing completing the assembly of the valve. This force places the frangible element into compression, compresses the helical spring 62, and disposes the poppet 64 away from the poppet seat allowing for the free passage of gas through the safety valve. This safety valve has fewer parts, is less expensive to manufacture, and is particularly suitable for use with non-toxic gas service such as oxygen. However, it should be realized that the valve can also be modified for use with toxic or explosive gases. In such service, a collar 46 and a washer 48 compatible with the gas service would be added to the valve.

Referring now to FIG. 9, a third preferred embodiment of an improved safety valve provided in accordance with the present invention can be seen. A cylindrical housing 58 and a threaded housing 74 are attached together as more fully described below. Referring to FIG. 8, apertures 60 are cut into the bottom end of the cylindrical housing to allow for the passage of gas from the compressed gas cylinder through the cylindrical housing, through the threaded housing 74, and into the gas passage channel 20 of the primary valve. The threaded housing 74 seats the valve into the cylinder port 16. The housing provides for a poppet seat (not illustrated). A poppet 70 passes through the poppet seat and is biased into the poppet seat by the helical spring 62. The poppet 70 is machined from square stock of a size which can snugly, but slidably, travel inside the cylindrical housing 58. The helical spring 62 is positioned on shaft 72 to bias the poppet into the poppet seat preventing the flow of gas to and from the compressed gas cylinder. The poppet 70 slidably travels within the cylindrical housing 58 guided by the edges of the stock from which it is machined. Gas to and from the compressed gas cylinder passes along the sides of the poppet. A frangible tube 76 is connected to the threaded housing 74 through a mechanical connection. Such a connection can be achieved by adding to one end of the tube an outwardly flairing rim to retain the tube inside the threaded housing. Alternatively, a mechanical connection can be achieved through the heat shrinking of dissimilar materials or the use of adhesives. The frangible tube 76 is made from a frangible material, similar to the materials used for the ceramic pin 38 and discussed above. Two holes 78 are drilled through the frangible tube 76 at approximately one-half inch up from the bottom of the frangible tube 76. A suitably sized spring pin 80 is inserted through the holes. The poppet 70 is disposed against the poppet seat in the housing 74 by the helical spring 62, which slides on the lower shaft of the poppet 70 and is opposed by the bottom plate of the cylindrical housing 58. The poppet includes a stem 82 which is disposed against the spring pin so as to normally hold the poppet in an open position away from the poppet seat. The cylindrical housing 58 is forced inside the threaded housing 74, and the cylindrical housing is then welded or permanently attached to the threaded housing completing the assembly of the valve.

At such time as the primary valve receives a blow or is deflected, the bending force is transferred to the frangible tube 76. A sufficient bending moment applied to the frangible tube results in a breaking of the tube which allows the poppet 70 to seat in the poppet seat. A bending force applied to the frangible tube 76 will result in a breaking of the tube at its weakest point, which is at the point where the holes 78 are drilled.

Referring again to FIG. 9, it is very desirable that a waist 84 be cut into the frangible tube 76 below the spring pin 80 to induce breaking of the tube at the waist, rather than at the holes 78. In this embodiment, the poppet 70 is held in a long-term stable condition off of the poppet seat by the frangible tube 76 held in compression. However, at such time as the frangible tube breaks at the waist 84, the portion of the frangible tube above the waist is pushed away by the poppet 70, as the poppet is forced into the poppet seat by the helical spring 62, and the separated portion of the frangible tube poses no possible obstruction to the seating of the poppet 70.

Some materials selected for the frangible tube may be difficult to drill. For such materials, it may be desirable to grind narrow, horizontal slots circumferentially into the frangible tube. In such an application, the use of a spring pin is discouraged. Instead, a slab of material, such as shim stock compatible with the gas service, may be slipped through two of such slots and provide a bridge to hold the poppet off of the poppet seat. As the use of slots results in significant weakening of the tube, there is no need to additionally weaken the frangible tube through the use of a waist.

Referring now to FIG. 12, an alternative means to seat an improved safety valve provided in accordance with the present invention can be seen. Slots 86 are cut into the top surface of the threaded housing 18 so as to mate with corresponding prongs 88 on the bottom face of a primary gas valve 14. The tubular portion 44 of the threaded housing 18 is first inserted into the gas passage channel 20 of the primary gas valve 14. Next, prongs 88 of the primary gas valve are mated with the slots 86 of the safety valve. Finally, the safety valve and the primary gas valve are seated as a unit into the cylinder port of a compressed gas cylinder.

Referring now to FIG. 13, a means to incorporate a flow restriction device into the improved safety valve provided in accordance with the present invention can be seen. Flow restriction orifices on primary gas valves are in common use in many industries, including the electronics industry, particularly with toxic gases. However, such devices must be removed prior to filling the compressed gas cylinder, and they are exposed to ambient conditions, resulting in corrosion of the device and the degradation of its utility. These problems are solved by the present invention. A flap 90 is shown, attached to the bottom of cylindrical housing 58, as shown in FIGS. 7 and 8. The flap 90 is constructed out of a pliant material compatible with the gas service, such as stainless steel shim stock. The flap includes a restrictive orifice 92 to limit the flow of gas from the compressed gas cylinder to the primary gas valve, sized for the desired delivery of gas. One side of the flap is spot welded 94 or otherwise permanently attached to the bottom of the cylindrical housing 58. The remaining three sides are unattached, allowing the flap to move away from the bottom of the cylindrical housing when under filling pressure.

In use, then, compressed gas inside the cylinder forces the flap 90 against the bottom of cylindrical housing 58, shutting off the flow of gas through holes 60. The flow of gas from the compressed gas cylinder is thereby restricted to the flow though the orifice in the flap, which is sized consistent with the desired flow from the primary gas valve. When the compressed gas cylinder is filled, supply gas is forced in the opposite direction through cylindrical housing 58 and holes 60. The pressurized flow of gas passing through holes 60 will push the flap 60 away from the bottom of cylindrical housing 58, allowing the cylinder to be filled in an unrestricted manner without the flow constraint imposed by the orifice.

Referring finally to FIG. 14, a means to remotely trigger the improved safety valve provided in accordance with the present invention can be seen. It is desirable to shut off the flow of gas from a pressurized cylinder to a primary gas valve in cases where the primary gas valve has become inoperable through corrosion or mechanical failure. A particularly dangerous situation arises where a malfunctioning primary gas valve refuses to adjust or close off the flow of gas for toxic or explosive gas service. Such a dangerous condition can be alleviated by the present invention. A cone 42 is shown configured to be received inside the tubular portion 44 of the threaded housing, as more fully illustrated by reference to FIG. 3. However, in the present embodiment, the cone 42 is retained inside the tubular portion of the threaded housing by means of a shoulder 43 incorporated into the rim of the tube. The cone is fabricated out of a fusible or eutectic material which will soften or melt at a pre-determined temperature, or range of temperatures, and which is compatible with the gas service.

Particularly suitable materials for the cone are alloys employed in conventional fusible plugs which are employed in overpressure safety devices utilized on many primary gas valves. Two alloy materials are commonly used in such applications. The metal alloy used in Type CG-2 fusible plugs melts at approximately 165 degrees F., and the alloy in Type CG-3 fusible plugs melts at approximately 212 degrees F. In fashioning the cone, the metal alloy can be plated or coated so as to be inert to the intended gas service. Depending on the service, platings of gold, platinum, or other metals may be suitable. In other service, the cone may be coated with Teflon or polymer coatings.

In use, then, a malfunctioning primary gas valve is heated by means of a torch or a resistive heating element, and the heat is applied to the portion of the primary gas valve in contact with the tubular portion of the threaded housing and cone of the safety valve. At such time as the cone is heated above its pre-determined melting temperature, it yields and no longer affords resistance to the force exerted on the frangible element 38, and the poppet 26, by the helical spring 28, and the poppet engages the poppet seat thereby closing off the flow of gas from the compressed gas cylinder. Once the poppet has seated in the poppet seat, the primary gas valve can be removed by conventional means.

U.S. Department of Transportation (DOT) regulations generally require the use of overpressure safety devices on primary gas valves, except for toxic gas service. Such devices employ a fusible plug, a burst disk, or both. As has been explained, the safety valve of the present invention can under certain circumstances shut off the flow of compressed gas to the primary gas valve and thereby interfere with the operation of an overpressure safety device. The DOT has not ruled whether the safety valve of the present invention can be utilized with gas service requiring the use of overpressure safety devices on primary gas valves. An alternative solution would be a redesign of the safety valve to incorporate an overpressure safety device into the safety valve. Such a modification would integrate a gas passage through the poppet to provide a means for the flow of gas from the compressed gas cylinder to the primary gas valve after the safety valve was triggered the poppet was seated in the poppet seat. On the downstream side of the gas passage through the poppet would be mounted an overpressure device of a conventional design.

While the invention has been described in connection with what is presently considered to be the most practical and preferred embodiments, it is to be understood that the invention is not be to be limited to the disclosed embodiment, but on the contrary is intended to cover various modifications and equivalent arrangements included within the spirit and scope of the appended claims.

What is claimed is:

1. A safety valve for a compressed gas cylinder to terminate gas flow from said cylinder when a primary gas valve attached to a cylinder port of said cylinder is deflected or severed, said safety valve being independently supported below said primary valve in said cylinder port, comprising:
   a threaded housing having a channel for the passage of gas adapted to be received in said cylinder port below said primary gas valve, a tubular portion of said threaded housing extending into a gas passage of said primary gas valve;
   a cylindrical housing adapted to be received inside said cylinder and attached to said threaded housing having an aperture for the passage of gas from said cylinder to said threaded housing;
   a poppet seat furnished in said threaded housing;
   a poppet furnished in said cylindrical housing;
   bias means furnished in said cylindrical housing to urge said poppet into said poppet seat; and
   a frangible element disposed in said threaded housing and holding said poppet off said poppet seat against the urging of said bias means whereby upon the severing or the deflection of said primary gas valve said frangible element will break thereby allowing said poppet to seat in said poppet seat and preventing the flow of gas from said cylinder to said primary valve.

2. A safety valve as in claim 1, wherein a deflection of the primary gas valve as much as 10 degrees from the normal will break said frangible element.

3. A safety valve as in claim 1, wherein said bias means is a helical spring.

4. A safety valve as in claim 1, further including a collar having inside and outside threads adapted to be received in the cylinder port and to accept said threaded housing so as to hold said safety valve in said cylinder port.

5. A safety valve as in claim 4, wherein said collar is made from a polymer material.

6. A safety valve as in claim 5, wherein said collar is made from a Kel-F.

7. A safety valve as in claim 1, wherein said frangible element has a high ratio of compression and tensile strength to shear strength.

8. A safety valve as in claim 7, wherein said frangible element is a ceramic material.

9. A safety valve as in claim 8, wherein said ceramic frangible element is alumina.

10. A safety valve as in claim 7, wherein said ceramic frangible element is in the shape of a pin.

11. A safety valve as in claim 10, wherein said ceramic frangible pin is mechanically weakened to induce breakage at a predetermined zone.

12. A safety valve as in claim 11, wherein said ceramic frangible pin is weakened by a waist cut round the pin.

13. A safety valve as in claim 11, wherein said ceramic frangible pin is weakened by a series of circumferential holes ablated into the pin by use of an industrial laser.

14. A safety valve as in claim 13, wherein said ceramic frangible pin is weakened by 10 to 20 approximately equally spaced circumferential holes with an aspect ratio of approximately 1:1 ablated into the pin by means of an industrial laser.

15. A safety valve as in claim 1, further including insertion means to thread said safety valve into said cylinder port whereby pivotal movement of a tool engages said insertion means and seats said valve into said cylinder port.

16. A safety valve as in claim 1, further including means to couple said safety valve to said primary gas valve and mating means incorporated into said primary gas valve whereby said safety valve and said primary gas valve can be seated together into said cylinder port.

17. A safety valve as in claim 16, wherein said coupling means consists of a slot in said threaded housing of said safety valve and a mating prong protruding from the bottom of said primary gas valve.

18. A safety valve as in claim 1, further including remote actuation means to achieve the seating of said poppet in said poppet seat without the deflection or severing of said primary gas valve.

19. A safety valve as in claim 18, wherein said remote actuation means consist of the use of a fusible material in said tubular portion of said threaded housing to receive said frangible element and the heating of said fusible material to a temperature above its melting point, whereby said fusible material fails under the force exerted by said bias means and said poppet seats in said poppet seat.

20. A safety valve as in claim further including flow restriction means to regulate the flow of compressed gas from said cylinder while allowing the unimpeded filling of said cylinder.

21. A safety device as in claim 20, wherein said flow restriction means consists of a flap with an aperture therein pivotally attached to said cylindrical housing, such that cylinder pressure forces said flap against said cylindrical housing covering said aperture in said cylindrical housing and allowing gas flow only through said aperture in said flap, while the pressure of gas filling the cylinder forces said flap away from said cylindrical housing allowing for the unimpeded filling of said cylinder.

22. A safety valve for a compressed gas cylinder to terminate gas flow from said cylinder when a primary gas valve attached to a cylinder port of said cylinder is deflected or severed, said safety valve being independently supported below said primary valve in said cylinder port, comprising:
   a threaded housing having a channel for the passage of gas adapted to be received in said cylinder port below said primary gas valve;
   a frangible tube attached to said threaded housing and extending into a gas passage of said primary gas valve;
   a cylindrical housing adapted to be received inside said cylinder and attached to said threaded housing having apertures for the passage of gas from the cylinder to said threaded housing;
   a poppet seat furnished in said threaded housing;
   a poppet to cooperate with said poppet seat to terminate gas flow from the cylinder;
   a bias means furnished in said cylindrical housing to urge the said poppet into the said poppet seat; and
   means to oppose said poppet in said frangible tube whereby said poppet is held off said poppet seat against the urging of said bias means whereby upon the deflection or severing of the primary gas valve said frangible tube will break thereby allowing said poppet to seat in said poppet seat and preventing the flow of gas from said cylinder to said primary valve.

23. A safety valve as in claim 22, wherein a deflection of the primary gas valve as much as 10 degrees from the normal will break said frangible tube.

24. A safety valve as in claim 22, wherein said bias means is a helical spring.

25. A safety valve as in claim 22, wherein said means to oppose poppet consist of two opposing apertures cut through the walls of the frangible tube and a spring pin received through said apertures.

26. A safety valve as in claim 22, further including a collar having inside and outside threads adapted to be received in the cylinder port and to accept said threaded housing so as to hold said safety valve in said cylinder port.

27. A safety valve as in claim 26, wherein said collar is made from a polymer material.

28. A safety valve as in claim 27, wherein said collar is made from Kel-F.

29. A safety valve as in claim 22, wherein said frangible tube has a high ratio of compression and tensile strength to shear strength.

30. A safety valve as in claim 29, wherein said frangible tube is a ceramic material.

31. A safety valve as in claim 30, wherein said frangible ceramic tube is alumina.

32. A safety valve as in claim 30, wherein said ceramic frangible tube is mechanically weakened to induce breakage at a predetermined zone.

33. A safety valve as in claim 32, wherein said ceramic frangible tube is weakened by a waist cut round said tube.

34. A safety valve as in claim 32, wherein said ceramic frangible tube is weakened by a series of circumferential holes ablated into the tube by use of an industrial laser.

35. A safety valve as in claim 22, further including insertion means to thread said safety valve into said cylinder port whereby pivotal movement of a tool engages said insertion means and seats said valve into said cylinder port.

36. A safety valve as in claim 22, further including means to couple said safety valve to said primary gas valve and mating means incorporated into said primary gas valve whereby said safety valve and said primary gas valve can be seated together into said cylinder port.

37. A safety valve as in claim 36, wherein said coupling means consists of a slot in said threaded housing of said safety valve and a mating prong protruding from the bottom of said primary gas valve.

38. A safety valve as in claim 22, further including remote actuation means to achieve the seating of said poppet in said poppet seat without the deflection or severing of said primary gas valve.

39. A safety valve as in claim 38, wherein said remote actuation means consist of the use of a fusible material in said tubular portion of said threaded housing to receive said poppet and hold said poppet off of the poppet seat and the heating of said fusible material to a temperature above its melting point, whereby said fusible material fails under the force exerted by said bias means and said poppet seats in said poppet seat.

40. A safety valve as in claim 22, further including flow restriction means to regulate the flow of compressed gas from said cylinder while allowing the unimpeded filling of said cylinder.

41. A safety device as in claim 40, wherein said flow restriction means consists of a flap with an aperture therein pivotally attached to said cylindrical housing, such that cylinder pressure forces said flap against said cylindrical housing covering said aperture in said cylindrical housing and allowing gas flow only through said aperture in said flap, while the pressure of gas filling the cylinder forces said flap away from said cylindrical housing allowing for the unimpeded filling of said cylinder.

* * * * *

UNITED STATES PATENT AND TRADEMARK OFFICE
CERTIFICATE OF CORRECTION

PATENT NO. : 5,144,973

DATED : September 8, 1992

INVENTOR(S) : Green et al.

It is certified that error appears in the above-identified patent and that said Letters Patent is hereby corrected as shown below:

On the title page of the Patent, in block [75] Inventors:, change "Oahu" to --Albuquerque--.

In Claim 20, column 12, line 30, of the Patent, change "claim" to --claim 1--.

Signed and Sealed this

Twenty-third Day of November, 1993

BRUCE LEHMAN

*Attest:*

*Attesting Officer*      *Commissioner of Patents and Trademarks*